Sept. 6, 1932.    J. V. BAYER    1,876,272
FOG PENETRATING TELEVISOR
Filed Dec. 16, 1930    3 Sheets-Sheet 1
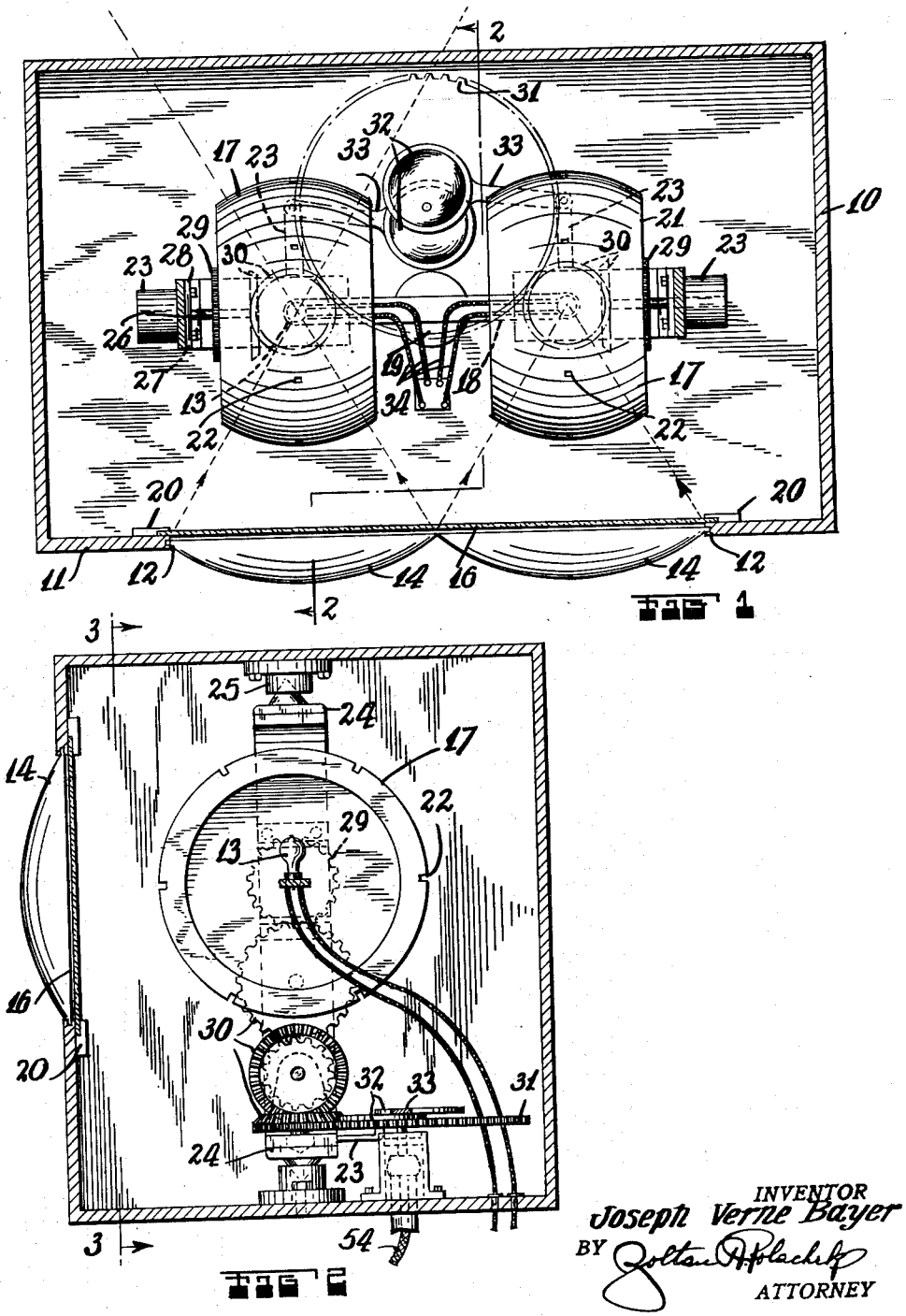
INVENTOR
Joseph Verne Bayer
BY
ATTORNEY Sept. 6, 1932.  J. V. BAYER  1,876,272
FOG PENETRATING TELEVISOR
Filed Dec. 16, 1930  3 Sheets-Sheet 2
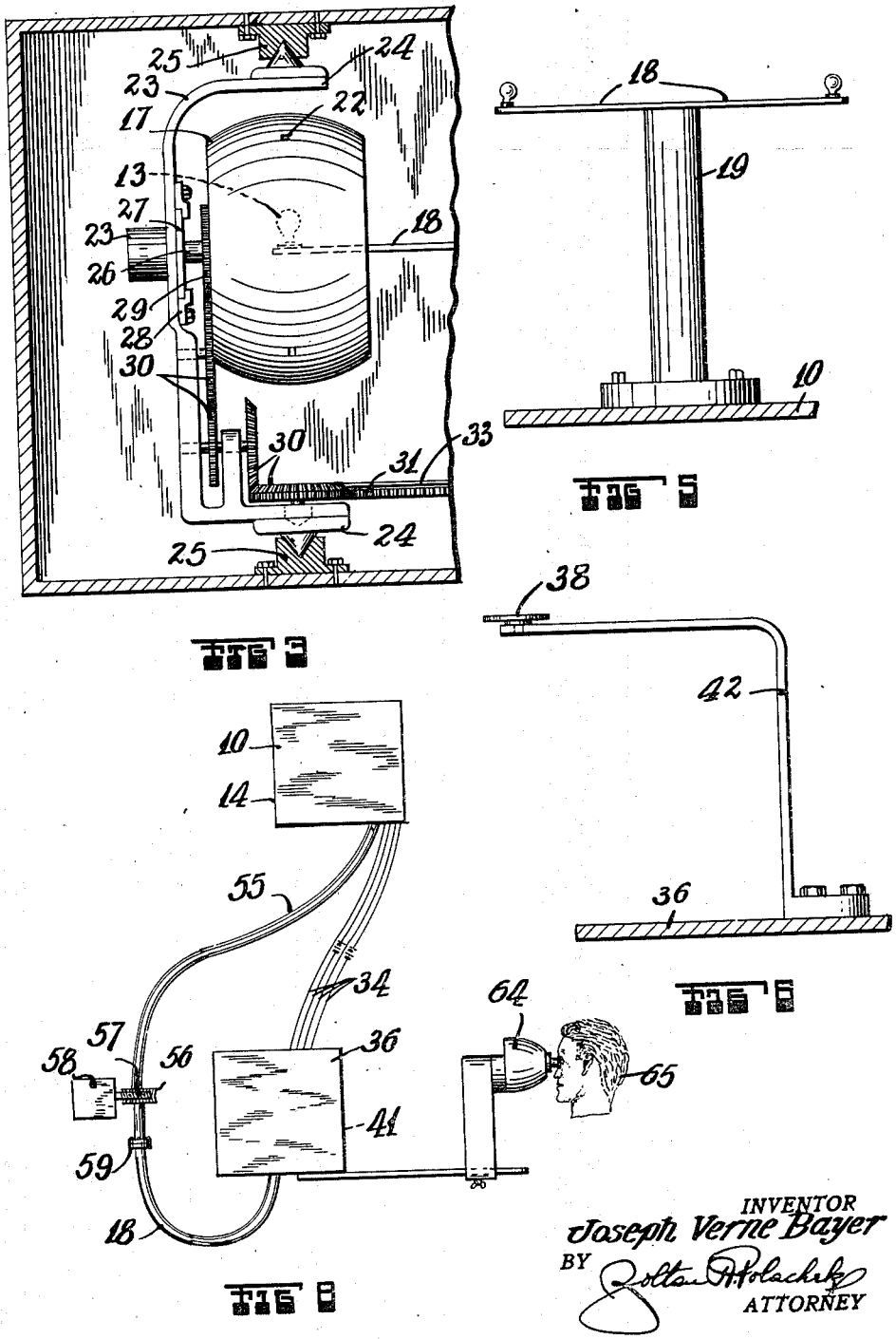

Sept. 6, 1932.    J. V. BAYER    1,876,272
FOG PENETRATING TELEVISOR
Filed Dec. 16, 1930    3 Sheets-Sheet 3
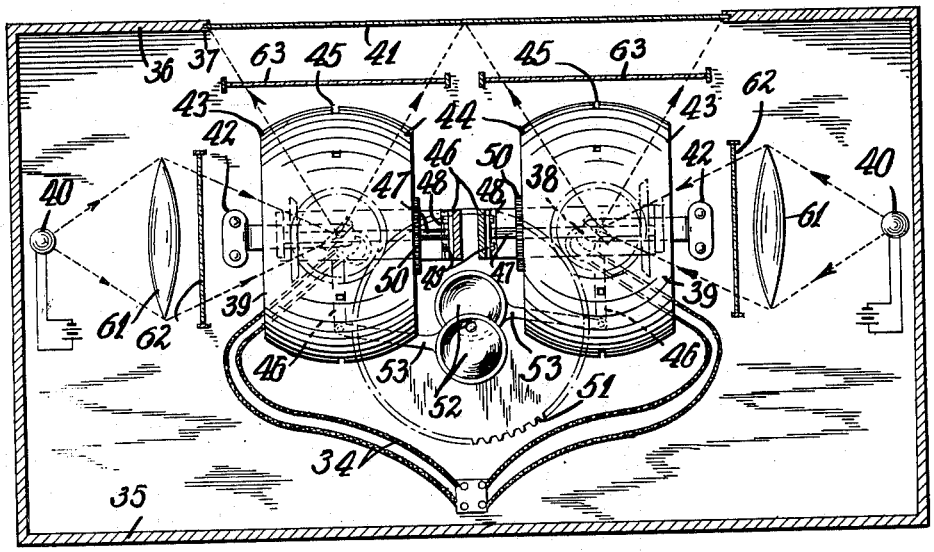
FIG. 4
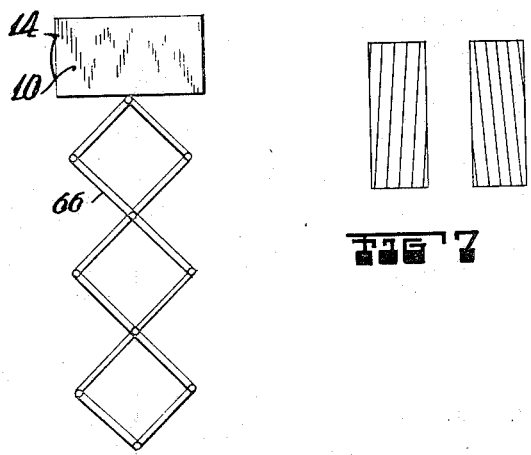
FIG. 7
FIG. 9
INVENTOR
Joseph Verne Bayer
BY
ATTORNEY Patented Sept. 6, 1932

1,876,272

UNITED STATES PATENT OFFICE

JOSEPH VERNE BAYER, OF FLORESVILLE, TEXAS

FOG PENETRATING TELEVISOR

Application filed December 16, 1930. Serial No. 502,648.

This invention relates to new and useful improvements in a fog penetrating televisor for seeing through fog, clouds, rain and smoke via mechanical means by which the invisible infra-red rays are translated into visible light. Fog, clouds and rain are great hazards to the proper safe handling of aircraft and sea-going ships. This invention is designed to eliminate these hazards by allowing the pilot to see through them.

It is an object of this invention to construct a fog penetrating televisor that actually allows the pilot to see through the hazards, thus giving them the actual condition of the terrian below and forward, and backwards if desired.

It is another object of this invention to construct a fog penetrating televisor which utilizes the long infra-red light rays which have greater penetrating power than the visible rays.

A still further object of this invention is to construct the various parts of aluminum alloys and other material so as to keep the device very light.

It is a still further object of this invention to provide a spreading and closing rack for the mounting of the transmission apparatus of the device upon the upper wing of an aeroplane or the like so that when it is not in use, it may be retracted into the ring. When in use, the arrangement should be such that it may be raised above the wing by suitable levers or other controls actuated by the pilot in the cockpit.

It is another object of this invention to arrange a receiving apparatus of the device so that it may be mounted in the cockpit or other part of an aeroplane or the like to be readily viewable by the pilot.

A still further object of this invention is the construction of a fog penetrating televisor which is stereoscopic, thus creating depth of vision which is the most essential thing to proper handling of aircraft and ocean ships, for without it the pilots would have no way of judging distance.

As a further object of this invention it is proposed to provide scanners which operate neither in the vertical nor in the horizontal as is usually the case, but which oscillate to the right and left and simultaneously revolve, and are so set as to produce vertical scanning lines either to the right or the left which are substantially 1½ degrees from the true vertical. Clearer images and more details are possible when scanning is done so that the images are scanned slightly different from each other with both the angles and the direction of scanning being different, when viewed by the operator through a stereoscope.

A still further object of this invention is to scan the individual pictures starting either from the right or the left, and after the complete scanning of one to scan back in the opposite direction.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a horizontal sectional view of an apparatus constructed according to this invention.

Fig. 2 is a transverse sectional view taken on the line 2—2 of Fig. 1.

Fig. 3 is a sectional view taken on the line 3—3 of Fig. 2.

Fig. 4 is a horizontal sectional view of the receiving apparatus of the device.

Fig. 5 is a fragmentary side elevational view of a hanger used to support certain cells in the device.

Fig. 6 is a fragmentary elevational view of the mounts for supporting certain mirrors in the device.

Fig. 7 is a schematic showing of the angles of scanning of the picture.

Fig. 8 is a side elevational view of a complete apparatus illustrated with a person viewing the same.

Fig. 9 is a side elevational view of the transmitting apparatus shown upon the extendable rack.

The fog penetrating televisor comprises a light proof casing 10 having in its front side 11, a pair of adjacent openings 12, a light sensitive cell 13 behind each of the openings 12, a lense 14 in each of the openings 12 focused upon the cells 13, a light shield 15 dividing the casing 10 into two compartments and separating the light from the lenses 14, an infra-red ray screen 16 behind each of the lenses 14 for allowing the passage of infra-red rays only, scanners 17 interposed between said cells 13 and the screen 16, means for operating said scanners 17, electric circuits including said light sensitive cells 13, and means for receiving the electric impulses in said circuits and converting them into a picture.

The casing 10 is in the form of a box. The light sensitive cells 13 may be photo-electric cells, thermostats, or any other elment or device which is sensitive to infra-red rays. According to Professor Silvanus P. Thompson, D. Sc., F. R. S., M. R. I., (lecturing at the Royal Institution of Great Britain during the Christmas lectures of 1896.) in his book "Light, Visible and Invisible", (McMillan Company), the invisible infra-red rays can be detected by a blackened thermometer; also the rays can be detected by an electrical thermometer called a thermopile, which is generally known in various electrical works. Langley using an instrument called a bolometer observed waves whose wave lengths were 592 millionths of an inch. Professor Rubens has measured infra-red rays as much as 944 millionths of an inch. Infra-red rays can also be detected by an instrument called a radimeter.

The infra red light sensitive cells 13 are supported upon the arms 18 of a hanger 19 attached within the casing 10. The arms 18 hold the cells 13 spaced from each other and directly at the focus of the lens 14. The lenses 14 may be made of rock-salt, or other material which allows infra-red rays to penetrate it.

The light shield 15 may be a sheet of aluminum extended transversely across the casing 10. The infra-red ray screen 16 may be an ebonite screen and should preferably be removably mounted in place. For this purpose, clips 20 are attached upon the casing 10 and serve to hold the screen 16 in place. The scanners 17 are in the form of barrels having their axis on the same line and closed at their outer ends 21, while their inner ends are opened so that the arms 18 of the hanger 19 may extend therein and support the cells 13 within the scanners. A plurality of square holes 22 are arranged along a large circle of the scanners 17 and are equally spaced from each other and positioned in the same plane with the cells 13.

Th means for operating said scanners comprises cradles 23 formed with upper and lower pointed members 24 engaging in bearings 25 attached upon the casing 10 so that the cradles may move in the arc of a circle. Stub shafts 26 are attached upon the closed ends of the barrel scanners 17 coaxially with their axis and support collars 27. The shafts 26 engage through the cradles 23 and the collars 27 are held flat against portions of the cradles by removable clips 28. Spur gears 29 are attached upon the shafts 26 and mesh with a system of gears 30 terminating in a large gear 31. Cams 32 are attached upon the large gear 31 and connect with connecting rods 33 pivotally connected with the cradles 23. The cams 32 are so arranged that as the large gear 31 rotates, the cradles will be pivoted towards each other and away from each other so as to move through amplitudes of substantially 60°.

The electric circuits which includes the light sensitive cells 13 comprise wires 34 connected in series with the cells and in series with magnets for oscillating mirrors contained in the receiving apparatus of the device. The receiving apparatus for receiving the electric impulses in the circuits 34 and converting them into a picture comprises a light proof casing 35 having a front side 36 with a screen opening 37, a pair of spaced electromagnetically oscillating mirrors 38 having limited apertures and for oscillating in proportion to the strengths of the impulses from the transmitting system, scanners 39 interposed between the mirrors 38 and the screen opening 37, means for operating said scanners 39 synchronized with the scanners 17 in the transmitting system, constant glow lamps 40 within said casing 36, and screen valve means for directing light from said lamps 40 onto said mirrors 38 to reflect them through said scanners 39 onto the screen within the opening 37.

The casing 36 is in the form of a box. The opening 37 has a screen 41 of the conventional ground glass type for constituting the screen opening before called for. The mirrors 38 are pivotally mounted upon mounts 42 attached upon the casing 36. The electromagnetic oscillating mirrors 38 are sensitive to impulses traveling along the wires 34 so as to oscillate according to the strengths of the impulses.

The scanners 39 are in the form of barrels with their axis on the same line, and having their outer ends 43 opened and their inner ends 44 closed. Through the opened outer ends the mounts 42 extend so as to hold the oscillating mirrors 38 within the scanners. A plurality of square openings 45 are arranged along a circle upon the barrel of the scanner and so positioned that the mirrors may reflect light from the lamp 40 through the openings and upon the screen. These openings should be equally spaced and the same in number as are arranged upon the scanners 17.

The means for operating the scanners 39 comprises cradles 46 formed with upper and lower pointed bearings similar to the cradles 23 and pivotally mounted in blocks corresponding with the blocks 25 which are attached within a casing 36. These blocks and pointed members upon the cradle are not illustrated, since they are identical to the form illustrated in Figs. 2 and 3.

Stub shafts 47 project from the closed ends 44 of the barrel scanners and rotatively engage within the cradles 46. Discs 48 are attached upon the shafts 47 and abut against the cradles 46 and are rotatively supported by clips 49. Bevel gears 50 are attached upon the shafts 47 and mesh with a train of gears similar to the train 30 described in the transmitting portion of the device, which terminate in a large gear 51. Cams 52 are mounted upon the gear 51 and engage connecting rods 53 pivotally connected with the cradles 46 so as to oscillate the cradles through angles of substantially 60°.

The means for operating the scanners 39 is synchronized with the means for operating the scanners 17 by means of a flexible shaft 54 within a flexible tubular member 55. The flexible shaft is connected at one end to drive the gear 51 and at the other end to drive the gear 31. A worm wheel 56 is fixed upon the flexible shaft 54 and meshes with a worm pinion 57 upon the shaft of an electric motor 58. A synchronizing coupling 59 is interposed between the ends of the flexible shaft 54 to provide for the synchronizing. This flexible coupling may consist of two discs, one of which is formed with say four holes and the other with a plurality of holes, and screws engaging into these holes, this structure not being illustrated on the drawings since it forms no part of the invention.

The constant glow lamps 40 may be neon or any other type, provided they have a steady glowing light. The screen valve means for directing light from the lamps 40 onto the mirrors 48 comprises lenses 61 positioned between the lamps 40 and the mirrors 38 and of a focus so as to concentrate the light from the lamps in a point upon the mirrors 38. Glass screen grids 62 are interposed between the lenses 61 and the mirrors 38 and are formed with a plurality of closely spaced black lines. The second glass screen grid 63 is interposed between the scanner barrels 39 and the screen 41 and are also formed with a plurality of parallel closely spaced black lines. The grids 62 and 63 are permanently attached upon the casing 36 and serve to allow the passage of light, or to completely cut off the passage of light, or to allow the passage to any desirable degree, depending upon the angles in which the mirrors 38 are disposed in any instant.

In Fig. 8 the device is shown in assembled condition with a stereoscope 64 supported on the casing 36. A person 65 is shown looking through the stereoscope onto the screen 41. The wires 34 are shown extended from the transmission apparatus to the receiving apparatus. The transmission apparatus may be supported upon a lazy tong structure 66 as shown in Fig. 9 so as to be extendible when so desired and to be capable of being moved into a retracted position.

The operation of the device may be traced by assuming the transmission portion of the device to be so positioned that the view to be seen is directly to the front of the lenses 14. The view will be reflected through the lenses 14 and scanned by the scanners 17 where the light vibrations are received by the infra-red sensitive cells 13, causing a change in electrical impulses carried through the wires 34 to the magnets of the oscillating mirrors 38. The oscillating mirrors receive light from the neon lamps 40 which is valved through the grids 62 and 63 and the vision appears on the ground glass 41 where it is viewed through the stereoscope 64.

The image on the ground glass is not scanned in vertical or horizontal lines as is the cause with customary scanners, but due to the right and left oscillations of the scanners 17 on the cradles 23, and due to the scanners revolving about their axis on the shafts 26. By this method the lines are scanned about 1½ degrees from the vertical to either right or left, depending upon the direction of oscillation of the scanners. In the receiver, the view is also scanned in the same manner.

Both in the transmitter and the receiver the two scanners always must oscillate towards and away from each other at the same time, this being accomplished by the cams 32 and 52, the connecting arms 33 and 53 and the cradles 23 and 46 respectively. For this reason the picture or vision will appear to the operator each scanned different from the other, both in the angle of the lines and the direction of scanning to either the right or the left. They are to be scanned about forty-eight lines to the picture and fifteen complete pictures appear scanned. For this reason the large gears 31 and 51 respectively must turn about nine hundred revolutions per minute. In the event that the scanning barrels are constructed with six holes, thus scanning six lines for each revolution of the scanner, and as there are about forty-eight lines, so it follows that the scanners must revolve about seventy-two hundred revolutions per minute.

The mirrors 38 receive light from a steady source, the lamps 40, and reflect it on the ground glass 41 where the image is formed, said light being already split up into very thin bars by the ground glass 62 and as the mirror 38 oscillates in proportion to the scanner strength from the photo-electric cells 13, it follows that at certain periods that split up light from the lamps 40 is reflected at different angles from the preceding period on the screen 63 which is so fixed that it either will allow the thin bars of light to pass through to the ground glass 41, or will retard the passage altogether, depending at what angle the bars of light are reflected by the mirrors 38. Therefore, the mirrors 38 will form an image on the ground glass by oscillating in proportion to the scanner strength of the cells 13, by reflecting the barred light from the lamps 24, from the screen 63 and the scanner 17 on the ground glass 41.

The glass screens 62 and 63 should each be ruled with about one hundred thirty-three black lines or bars, and one hundred thirty-two clear lines or bars to the inch, making about two hundred sixty-five lines or bars to the inch, a black line always alternating with a white one in which the whole is ruled. Preferably, the lines should be ruled vertically. These screens are used to valve the quantity of light from the glow lamps 40 to the ground glass 41 by the oscillating mirror 27. The screens 62 pass one hundred thirty-two bars of light per inch to the mirrors 38 (which are, however, reduced to a point by the lenses 61), which reflects and spreads the light to the screen 63 which either completely checks its further progress or allows the light to continue to the ground glass 41 where the image is scanned by the scanners 39.

In my fog penetrating televisor, it is proposed to first split up into narrow lines or beams by the scanners 17 and the lines into dark, medium and light parts according to the light's position of the object scanned, the cells 13 reacting under these and passing these scanners to the electromagnets of the mirrors 38 in the receivers, whereby means of the scanners 39 they are reassembled into an image on the ground glass 41. So it makes no difference how and in what direction the object is scanned, so far as the image is finally assembled to resemble the object.

In my fog penetrating televisor, the objects are scanned always on the opposite edges of the field of vision of the two scanners, the lines being scanned are always about 1½ degrees from the vertical either to the right or left due to the right and left oscillations of the scanners, and each scanner when scanned from the right edge to the left scans the lines 1½ degrees to the left off vertical, and on its return from left to right it again scans the lines 1½ degrees off vertical to the right. Each scanner scans in the opposite direction from the other always. When the two images are assembled on the ground glass 41 in their proper order and when viewed through the stereoscope 64, tend to produce a blended image with far more detail and depth of vision than would be otherwise possible. The lines scanned by the two scanners of the image will tend to cross in the image as seen in the stereoscope.

The screen 16 is arranged so that it can be quickly and easily removed. It may be necessary to filter out all visible rays of light, including the invisible ultra-violet rays except the invisible infra-red rays, because when an aircraft would approach a cloud or fog bank, or even within the cloud itself, the visible light that is nearly always present in such clouds might reflect from the fog particles into the lens of the televisor, the images in the receiver being received as outlines of the cloud or fog bank instead of penetrating through the fog, thus defeating the very purpose for which my instrument is intended, and perhaps, the images may show signs of halation, due to the influence of visible light.

In Fig. 8 the direction of scanning of the two images is shown. On the second period, the left image is scanned as the right image in the first period, while the right image is again scanned as the left. The angles shown on the drawings are greatly exaggerated. When this picture is viewed from the stereoscope, the two images will blend into one image giving depth to the picture.

While one type of scanner has been illustrated and described in my device, this is not intended as a limitation since other types may be used with results equally as well. For example, the scanner may be modified to be of a wide flexible band type, with regularly spaced holes on the edges for the driving mechanism, and the scanning holes being square and start at one side of the band regularly spaced lineally apart and ending near the other edge. And in order to be compact, the scanning band can be folded back upon itself in any suitable portion of the instrument. It is to be driven by a mechanism similar to the motion picture machine, only the band in this televisor is steadily run. A scanner of this type would be useful for creating large television pictures. I intend the band scanner as a modification to the scanners of the above described fog penetrating televisor.

The second type of scanner could be of a flexible band type similar to the above, only it is to be very narrow, with having only a few scanning holes regularly spaced behind each other in a straight line, scanning the pictures by nearly the same method as the barrel-shaped scanner, and also being mounted in a cradle, which oscillates to the right or left, but which does not oscillate on an axis similar to that of the cradle 23 at 46, but oscillates on a plan parallel to the plane or lens and ground glass similar to 14 and 41. Immediately by the scanning band and in behind of the lens or ground lens not otherwise covered by the band, are to be secured a set of bellows similar to those of cameras but instead as on cameras are to be attached to the sides of the case, the other being attached to the oscillating cradle.

This is for the purpose of shutting out all light folding and opening as the case may be following the movements to right or left of the scanner. This scanner can also be used for scanning large pictures, and is intended as a modification of the other above described scanners.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A fog penetrating televisor, comprising a light proof casing having in its front side a pair if adjacent openings, a light sensitive cell behind each opening, a lens in each opening focused upon said cells, a shield dividing said casing in two and separating the light from said lenses, an infra-red ray screen behind each lens for allowing the passage of infra-red rays only, barrel scanners interposed between said cells and screen for enclosing said cells, means for operating said scanners, electric circuits including said light sensitive cells, and means for receiving the electric impulses in said circuits and converting them into a picture.

2. A fog penetrating televisor, comprising a light proof casing having in its front side a pair of adjacent openings, a light sensitive cell behind each opening, a lens in each opening focused upon said cells, a shield dividing said casing in two and separating the light from said lenses, an infra-red ray screen behind each lens for allowing the passage of infra-red rays only, scanners interposed between said cells and screen, means for operating said scanners, electric circuits including said light sensitive cells, and means for receiving the electric impulses in said circuits and converting them into a picture, said scanners being in the form of barrels with a plurality of scanning openings arranged along one circle of the barrel directly in the same plane with said sensitive cells.

3. A fog penetrating televisor, comprising a light proof casing having in its front side a pair of adjacent openings, a light sensitive cell behind each opening, a lens in each opening focused upon said cells, a shield dividing said casing in two and separating the light from said lenses, an infra-red ray screen behind each lens for allowing the passage of infra-red rays only, scanners interposed between said cells and screen, means for operating said scanners, electric circuits including said light sensitive cells, and means for receiving the electric impulses in said circuits and converting them into a picture, said scanners being in the form of barrels with a plurality of scanning openings arranged along one circle of the barrel directly in the same plane with said sensitive cells, and a means being provided for rotatively and oscillatably supporting said scanners.

4. A fog penetrating televisor, comprising a light proof casing having in its front side a pair of adjacent openings, a light sensitive cell behind each opening, a lens in each opening focused upon said cells, a shield dividing said casing in two and separating the light from said lenses, an infra-red ray screen behind each lens for allowing the passage of infra-red rays only, barrel scanners interposed between said cells and screen for enclosing said cells, means for operating said scanners, electric circuits including said light sensitive cells, and means for receiving the electric impulses in said circuits and converting them into a picture, said means for operating the scanners comprising a large gear connected with some source of rotation and carrying cams connected with cradles pivotally mounted so as to be capable of oscillating through angles of substantially $60°$.

5. A fog penetrating televisor, comprising a light proof casing having in its front side a pair of adjacent openings, a light sensitive cell behind each opening, a lens in each opening focused upon said cells, a shield dividing said casing in two and separating the light from said lenses an infra-red ray screen behind each lens for allowing the passage of infra-red rays only, barrel scanners interposed between said cells and screen for enclosing said cells, means for operating said scanners, electric circuits including said light sensitive cells, and means for receiving the electric impulses in said circuits and converting them into a picture, said means for operating the scanners comprising a large gear connected with some source of rotation and carrying cams connected with cradles pivotally mounted so as to be capable of oscillating through angles of substantially $60°$, and a gear system connected from said large gear to oscillate said cradles through the specified angles.

6. A fog penetrating televisor, comprising a light proof casing having in its front side a pair of adjacent openings, a light sensitive cell behind each opening, a lens in each opening focused upon said cells, a shield dividing said casing in two and separating the light from said lenses, an infra-red ray screen behind each lens for allowing the passage of infra-red rays only, barrel scanners interposed between said cells and screen for enclosing said cells, means for operating said scanners, electric circuits including said light sensitive cells, and means for receiving the electric impulses in said circuits and converting them into a picture, comprising a light proof casing having a front side with a screened opening, a pair of spaced electromagnetically oscillating mirrors for oscillating in proportion to the strengths of impulses from a transmitting system, scanners interposed between said mirrors and screened opening, means for operating said scanners synchronized with corresponding scanners in said transmitting system, constant glow lamps within said casing, and screen valve means for directing light from said lamps onto said mirrors to reflect through said scanners onto said screen.

7. A means for receiving the electric impulses given out by a transmitting apparatus in a fog penetrating televisor, comprising a light proof casing having a front side with a screened opening, a pair of spaced electromagnetically oscillating mirrors for oscillating in proportion to the strengths of impulses from a transmitting system, barrel scanners interposed between said mirrors and screened opening for enclosing said mirrors, means for operating said scanners synchronized with corresponding scanners in said transmitting system, constant glow lamps within said casing and screen valve means for directing light from said lamps onto said mirrors to reflect through said scanners onto said screen.

8. A means for receiving the electric impulses given out by a transmitting apparatus in a fog penetrating televisor, comprising a light proof casing having a front side with a screened opening, a pair of spaced electromagnetically oscillating mirrors for oscillating in proportion to the strengths of impulses from a transmitting system, barrel scanners interposed between said mirrors and screened opening for enclosing said mirrors, means for operating said scanners synchronized with corresponding scanners in said transmitting system, constant glow lamps within said casing, and screen valve means for directing light from said lamps onto said mirrors to reflect through said scanners onto said screen, the screened opening in said casing comprising an opening covered by a ground glass.

9. A means for receiving the electric impulses given out by a transmitting apparatus in a fog penetrating televisor, comprising a light proof casing having a front side with a screened opening, a pair of spaced electromagnetically oscillating mirrors for oscillating in proportion to the strengths of impulses from a transmitting system, barrel scanners interposed between said mirrors and screened opening for enclosing said mirrors, means for operating said scanners synchronized with corresponding scanners in said transmitting system, constant glow lamps within said casing, and screen valve means for directing light from said lamps onto said mirrors to reflect through said scanners onto said screen, anchor members being arranged for supporting said electro-magnetically oscillated mirrors.

10. A means for receiving the electric impulses given out by a transmitting apparatus in a fog penetrating televisor, comprising a light proof casing having a front side with a screened opening, a pair of spaced electromagnetically oscillating mirrors for oscillating in proportion to the strengths of impulses from a transmitting system, barrel scanners interposed between said mirrors and screened opening for enclosing said mirrors, means for operating said scanners synchronized with corresponding scanners in said transmitting system, constant glow lamps within said casing, and screen valve means for directing light from said lamps onto said mirrors to reflect through said scanners onto said screen, said scanners being in the form of barrels with one of their ends closed, hangers extending into the opened ends of said barrels and supporting said magnetically oscillating mirrors, and a means for operating the scanners being connected on the closed ends of the barrels.

11. A fog penetrating televisor, comprising a light proof casing having in its front side a pair of adjacent openings, a light sensitive cell behind each opening, a lens in each opening focused upon said cells, a shield dividing said casing in two and separating the light from said lenses, an infra-red ray screen behind each lens for allowing the passage of infra-red rays only, barrel scanners interposed between said cells and screen for enclosing said cells, means for operating said scanners, electric circuits including said light sensitive cells, and means for receiving the electric impulses in said circuits and converting them into a picture, comprising a light proof casing having a front side with a screened opening, a pair of spaced electromagnetically oscillating mirrors for oscillating in proportion to the strengths of impulses from a transmitting system, scanners interposed between said mirrors and screened opening, means for operating said scanners synchronized with corresponding scanners in said transmitting system, constant glow lamps within said casing, and screen valve means for directing light from said lamps onto said mirrors to reflect through said scanners onto said screen, a flexible shaft being connected between operating gears of said scanners, and said synchronizing being accomplished by an adjustable coupling interposed intermediate the ends of said shaft.

12. A means for receiving the electric impulses given out by a transmitting apparatus in a fog penetrating televisor, comprising a light proof casing having a front side with a screened opening, a pair of spaced electromagnetically oscillating mirrors for oscillating in proportion to the strengths of impulses from a transmitting system, barrel scanners interposed between said mirrors and screened opening for enclosing said mirrors, means for operating said scanners synchronized with corresponding scanners in said transmitting system, constant glow lamps within said casing, and screen valve means for directing light from said lamps onto said mirrors to reflect through said scanners onto said screen, said constant glow lamps being neon or the like.

13. A means for receiving the electric impulses given out by a transmitting apparatus in a fog penetrating televisor, comprising a light proof casing having a front side with a screened opening, a pair of spaced electromagnetically oscillating mirrors for oscillating in proportion to the strengths of impulses from a transmitting system, barrel scanners interposed between said mirrors and screened opening for enclosing said mirrors, means for operating said scanners synchronized with corresponding scanners in said transmitting system, constant glow lamps within said casing, and screen valve means for directing light from said lamps onto said mirrors to reflect through said scanners onto said screen, comprising a lens interposed between said lamps and said mirrors for concentrating the lines of the lamps to a point on the mirrors, a glass screen with a plurality of ruled lines disposed between said lenses and said mirrors, and other glass screens with ruled lines interposed between said scanners and the screened opening of said casing.

14. A fog penetrating televisor, comprising a light proof casing having in its front side a pair of adjacent openings, a light sensitive cell behind each opening, a lens in each opening focused upon said cells, a shield dividing said casing in two and separating the light from said lenses, an infra-red ray screen behind each lens for allowing the passage of infra-red rays only, barrel scanners interposed between said cells and screen for enclosing said cells, means for operating said scanners, electric circuits including said light sensitive cells, and means for receiving the electric impulses in said circuits and converting them into a picture, comprising a light proof casing having a front side with a screened opening, a pair of spaced electromagnetically oscillating mirrors for oscillating in proportion to the strengths of impulses from a transmitting system, scanners interposed between said mirrors and screened opening, means for operating said scanners synchronized with corresponding scanners, in said transmitting system, constant glow lamps within said casing, and screen valve means for directing light from said lamps onto said mirrors to reflect through said scanners onto said screen, said electric circuits comprising wires connecting in series with said glow lamps and the magnets of said electro-magnetically oscillated mirrors.

15. A means for receiving the electric impulses given out by a transmitting apparatus in a fog penetrating televisor, comprising a light proof casing having a front side with a screened opening, a pair of spaced electromagnetically oscillating mirrors for oscillating in proportion to the strength of impulses from a transmitting system, scanners interposed between said mirrors and screened opening, means for operating said scanners synchronized with corresponding scanners in said transmitting system, constant glow lamps within said casing, and screen valve means for directing light from said lamps onto said mirrors to reflect through said scanners onto said screen, said means for operating the scanners including a gear carrying cams connected with cradles rotatively supporting said scanners, and a driving means from said scanners to said gear.

In testimony whereof I have affixed my signature.

JOSEPH VERNE BAYER.